US007969958B2

(12) United States Patent
Yuasa

(10) Patent No.: US 7,969,958 B2
(45) Date of Patent: Jun. 28, 2011

(54) RADIO COMMUNICATION APPARATUS AND RADIO COMMUNICATION CONTROL METHOD OF RADIO COMMUNICATION SYSTEM

(75) Inventor: Tomokazu Yuasa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 619 days.

(21) Appl. No.: 12/123,321

(22) Filed: May 19, 2008

(65) Prior Publication Data

US 2008/0291890 A1    Nov. 27, 2008

(30) Foreign Application Priority Data

May 24, 2007    (JP) ................... 2007-138129

(51) Int. Cl.
*H04B 7/212*    (2006.01)

(52) U.S. Cl. ...................... 370/348; 370/431

(58) Field of Classification Search .................. 370/348, 370/431
See application file for complete search history.

(56) References Cited

U.S. PATENT DOCUMENTS

| 5,995,500 | A * | 11/1999 | Ma et al. ................ 370/337 |
| 7,519,013 | B2 * | 4/2009 | Destino et al. ............ 370/310 |
| 7,596,646 | B2 * | 9/2009 | Kim et al. .................. 710/72 |
| 7,778,603 | B2 * | 8/2010 | Palin et al. ................ 455/41.2 |

FOREIGN PATENT DOCUMENTS

| JP | 2005-333188 | 12/2005 |
| JP | 2006-287937 | 11/2006 |
| JP | 2007-502087 | 2/2007 |

* cited by examiner

*Primary Examiner* — Phuc Tran
(74) *Attorney, Agent, or Firm* — Blakely, Sokoloff, Taylor & Zafman LLP

(57) ABSTRACT

According to one embodiment, a radio communication apparatus includes a first reservation slot securing unit, a second reservation slot securing unit and a radio communication unit. The first reservation slot securing unit secures a first reservation slot for performing radio communication through a first transmission output in a radio communicable slot to be shared in time division in a group by adjustment in periodically formed beacon slots. The second reservation slot securing unit secures a second reservation slot for performing radio communication through a second transmission output smaller than the first transmission output in the radio-communicable period, when the first reservation slot securing unit fails in securing the first reservation slot. And the radio communication unit performs radio communication through the first transmission output or the second transmission output by using at least either the first reservation slot or the second reservation slot.

9 Claims, 8 Drawing Sheets

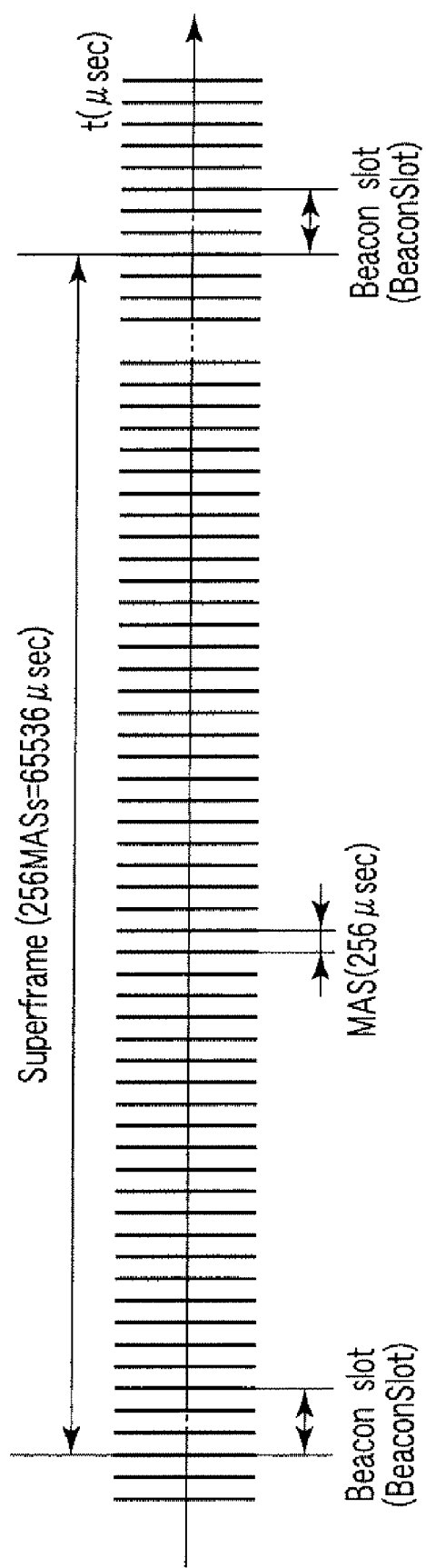
F I G. 3

| TFC Number | BAND ID | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |

| Lv transition history of RSSI | | | | | Signal strength variation value |
|---|---|---|---|---|---|
| | t | t-1 | t-2 | ... | |
| Stream0-1 | 1 | 1 | 1 | ... | 0 |
| Stream0-3 | 3 | 3 | 3 | ... | − |
| Stream2-3 | 2 | 2 | 2 | ... | + |
| Stream3-4 | 1 | 1 | 1 | ... | 0 |

F I G. 10

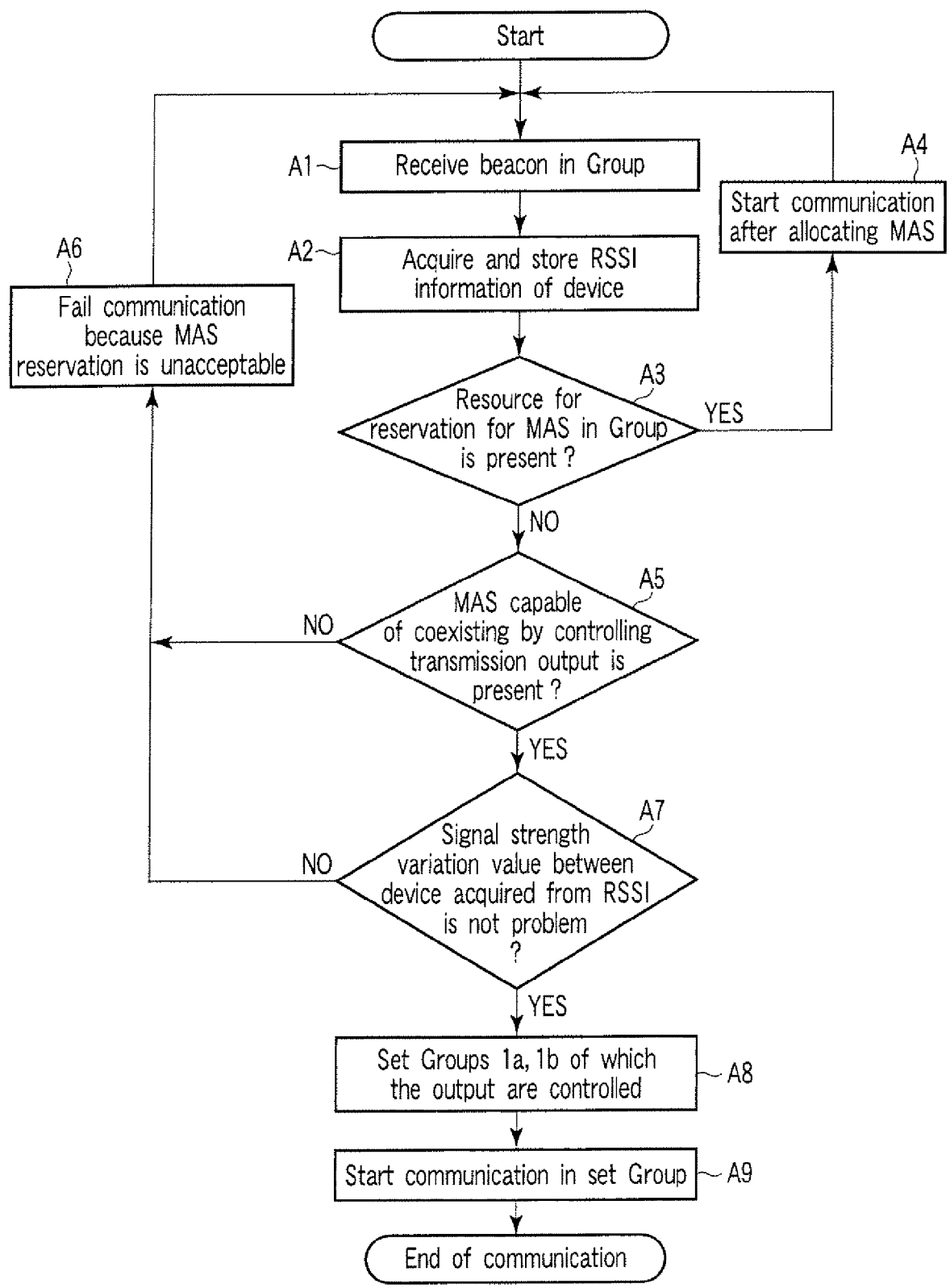
F I G. 11

RADIO COMMUNICATION APPARATUS AND RADIO COMMUNICATION CONTROL METHOD OF RADIO COMMUNICATION SYSTEM

CROSS-REFERENCE TO RELATED APPLICATIONS

This application is based upon and claims the benefit of priority from Japanese Patent Application No. 2007-138129, filed May 24, 2007, the entire contents of which are incorporated herein by reference.

BACKGROUND

1. Field

One embodiment of the invention relates to a radio communication control technique which efficiently performs radio communication, for example, compliant with ultra-wide band (UWS) standards.

2. Description of the Related Art

In recent years, many of information processing apparatuses, such as personal computers, have mounted radio communication functions. For instance, in offices, local area networks (LANs) are laid in order to share resources in many cases. If communication may be performed without cable, layouts in the offices may be easily changed.

As regards a method of radio communication to be executed by the information processing apparatuses of this kind, there is a method for applying time division to a prescribed frequency band by a plurality of information processing apparatuses to share the frequency band. Recently, the UWS standards that are the standards for performing radio communication in this method have attracted a great deal of attention. Various proposals for efficiently making the radio communication compliant with the UWB standards have been suggested (e.g., refer to JPN. PCT National Publication No. 2007-502087).

Here, it is assumed a case in which the radio communication apparatus A is going to start radio communication with a radio communication apparatus B on a certain network. To perform this radio communication, the resources (some parts of prescribed frequency band) have to be allocated; however, it is assumed that the network is in a situation which is impossible to be allocated the resources.

The ultra-wideband communication system which is disclosed in JPN. PCT National Publication No. 2007-502087 proposes a scheme for appropriately selecting communication parameters in order to efficiently perform the radio communication with the radio communication apparatus B on the assumption that the resources for performing the radio communication with the radio communication apparatus B is reserved.

However, if a case in which the network is short of resources occurs, an existing radio communication system including the ultra-wideband communication system disclosed in JPN. PCT National Publication No. 2007-502087 has to wait for the time when the scarce resources will be released in the present circumstances.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary view depicting a structure of a superframe to be used in a UWB;

FIG. 10 is an exemplary view depicting an example in which the UWB device of the embodiment calculates an inter-device signal strength variation value based on received signal strength indicator (RSSI) information; and FIG. 11 is an exemplary flowchart depicting a communication control procedure of the UWS device of the embodiment.

DETAILED DESCRIPTION

Various embodiments according to the invention will be described hereinafter with reference to the accompanying drawings. In general, according to one embodiment of the invention, a radio communication apparatus includes a first reservation slot securing unit, a second reservation slot securing unit and a radio communication unit. The first reservation slot securing unit secures a first reservation slot for performing radio communication through a first transmission output in a radio communicable slot to be shared in time division in a group by adjustment in periodically formed beacon slots. The second reservation slot securing unit secures a second reservation slot for performing radio communication through a second transmission output smaller than the first transmission output in the radio-communicable period, when the first reservation slot securing unit fails in securing the first reservation slot. And the radio communication unit performs radio communication through the first transmission output or the second transmission output by using at least either the first reservation slot or the second reservation slot.

Here, it is assumed that a radio communication apparatus regarding the invention is realized as a UWB device for making radio communication compliant with UWB standards.

Figure 1:
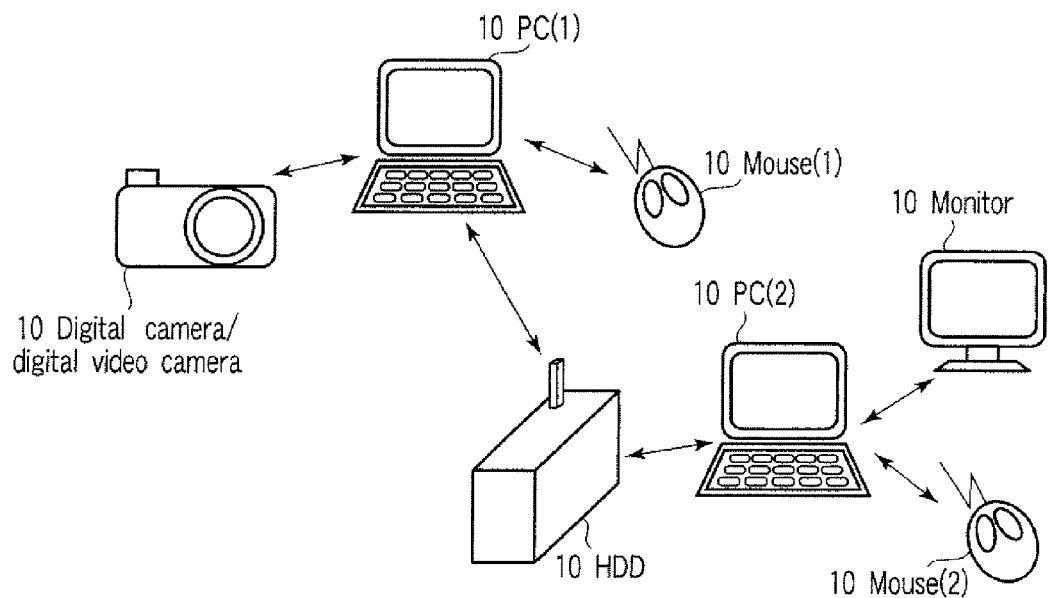
FIG. 1 is an exemplary view depicting an example with a radio communication apparatus (USB device) applied thereto regarding an embodiment of the invention.

FIG. 1 shows an exemplary view illustrating an example with the radio communication apparatus of the embodiment applied thereto. Each apparatus in FIG. 1, such as a personal computer (PC) (1), a mouse (1), a digital camera/digital video camera, a hard disk drive (HDD), a PC (2), a mouse (2), a monitor is a USB device 10 of the embodiment with a UWB module for executing the radio communication compliant with the UWB standards mounted thereon, and establishes radio communication with other devices by using an application such as wireless USB and Bluetooth (registered trademark).

It is assumed that the PC (1) 10 obtains video data stored in the digital camera 10 by use of the wireless mouse (1) 10. It is also assumed that the PC (2) 10 adjacent to the PC (1) 10 displays a work screen on a secondary monitor 10 by using the wireless mouse (2) 10, and makes the external HDD 10 manage data.

In the UWB, each UWB device forms a group by utilizing a shared frequency defined by the TFC numbers (hopping pattern in channel), and makes communication in the group by belonging to the group. The communication is managed in times; all the UWS devices belonging to the group receive signals from other UWB devices during beacon slots, and recognize the current communication situation. The communication situation includes which of the UWB devices belong to the group, and a secured situation of reservation slots called MASs to be occupied in communicating the UWB devices with one another.

The MASs are present by 256 in one superframe, and the UWB devices belonging to the group share the MASs by time division by the UWB devices with one another. When a certain UWB device requires some MASs, in the case of no existence of free one, if any handling is not implemented, the UWB device may not secure any MAS and may not start communication.

For instance, in a situation in which the UWB devices are concentrated as shown in FIG. 1, if the PC (1) 10 intends to send a large volume of files to the HDD 10, or intends to start access for the HUD 10 so as to read a large volume of files from the HDD 10, it is hard for the transfer of the large volume of files to newly assure a sufficient band from the frequency band now in use.

Therefore, the UWB device of the embodiment has a scheme making it possible to immediately start the communication even in such a situation, and the following will describe this point in detail.

Figure 2:
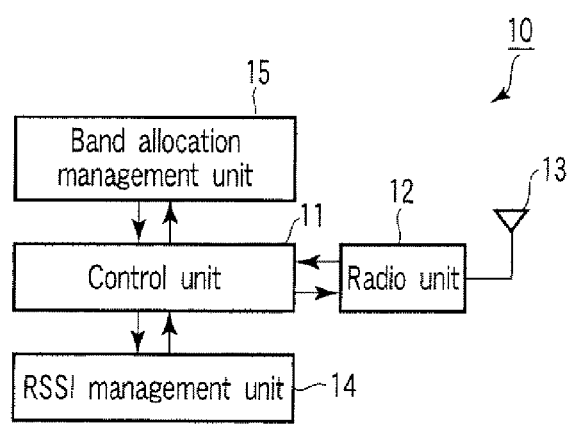
FIG. 2 is an exemplary block circuit diagram of the UWB device of the embodiment.

FIG. 2 shows an exemplary block circuit diagram of the UWB device 10 of the embodiment. As shown in the figure, the UWS device 10 of the embodiment includes a control unit 11 for controlling the entire of the UWB device 10, a radio unit 12 and an antenna 13 usable in a band of the UWB, an RSSI management unit 14 for extracting to store information (RSSI information) on the RSSI included in a beacon and calculating a signal strength variation value, and a band allocation management unit 15 for allocating and managing the band to be used for the communication of the self device.

FIG. 3 shows an exemplary structure of a superframe. Generally, a beacon slot for all devices in the group to recognize current states is disposed at the head of the superframe (65536 μsec). From this beacon slot to the next beacon slot becomes a communicable time period which may be shared by the UWB devices with one another. The communicable time period is managed for each MAS by setting one MAS to 256 μsec (namely, one superframe is composed of 256 MASs). The beacon transmitted and received among each UWB device 10 during beacon slot includes the RSSI information.

Figures 4, 5:
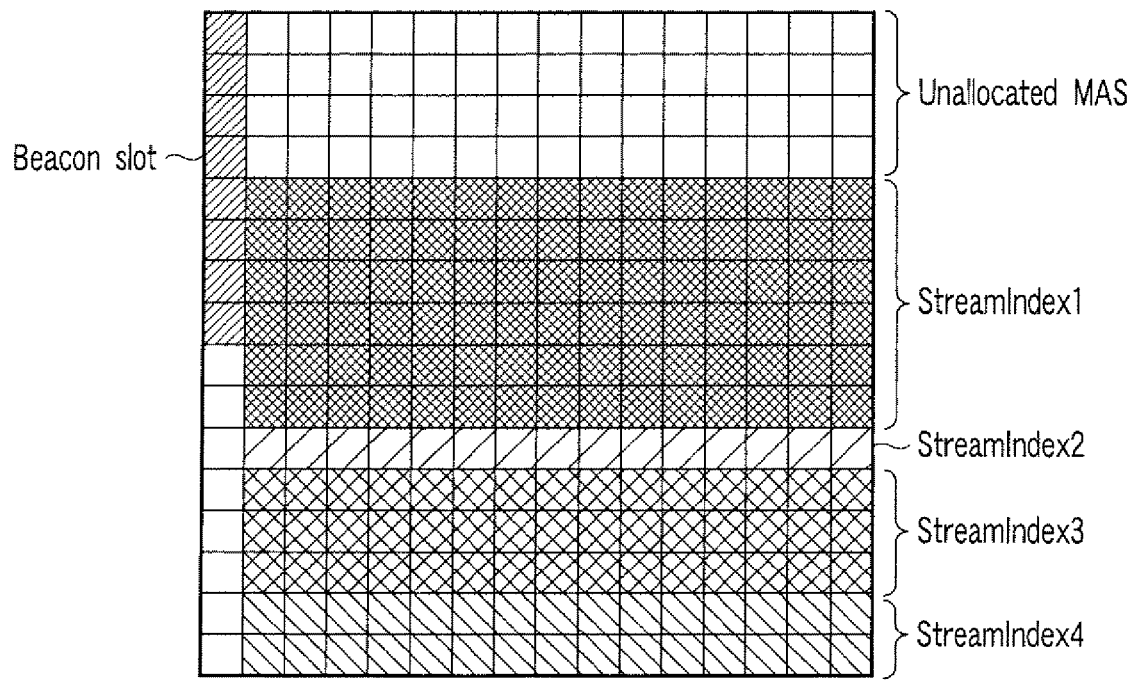
FIG. 4 is an exemplary schematic view depicting the superframe in FIG. 3 in medium access slots (MASs)
FIG. 5 is an exemplary view depicting concrete MAS allocation of the superframe by using the schematic view of FIG. 4.

FIG. 4 shows an exemplary schematic view illustrating the superframe for each MAS. Ordinarily, the superframe is illustrated in a two-dimensional (2D) structure of longitudinal 16×transversal 16 as shown in the figure.

FIG. 5 shows an exemplary concrete MAS allocation. Each UWB device 10 reserves a MAS necessary for the communication of the device 10 itself. If the securing of the required communication time period (MAS) has completed successfully, the superframe adds a management number called a stream index to the slot to occupy the MAS in the slot. Stream indexes may be allocated eight at a maximum for one group. Basically, the MAS which has been reserved by other UWB device 10 may not be used until the other USB device release the reserved MAS.

Figure 6:
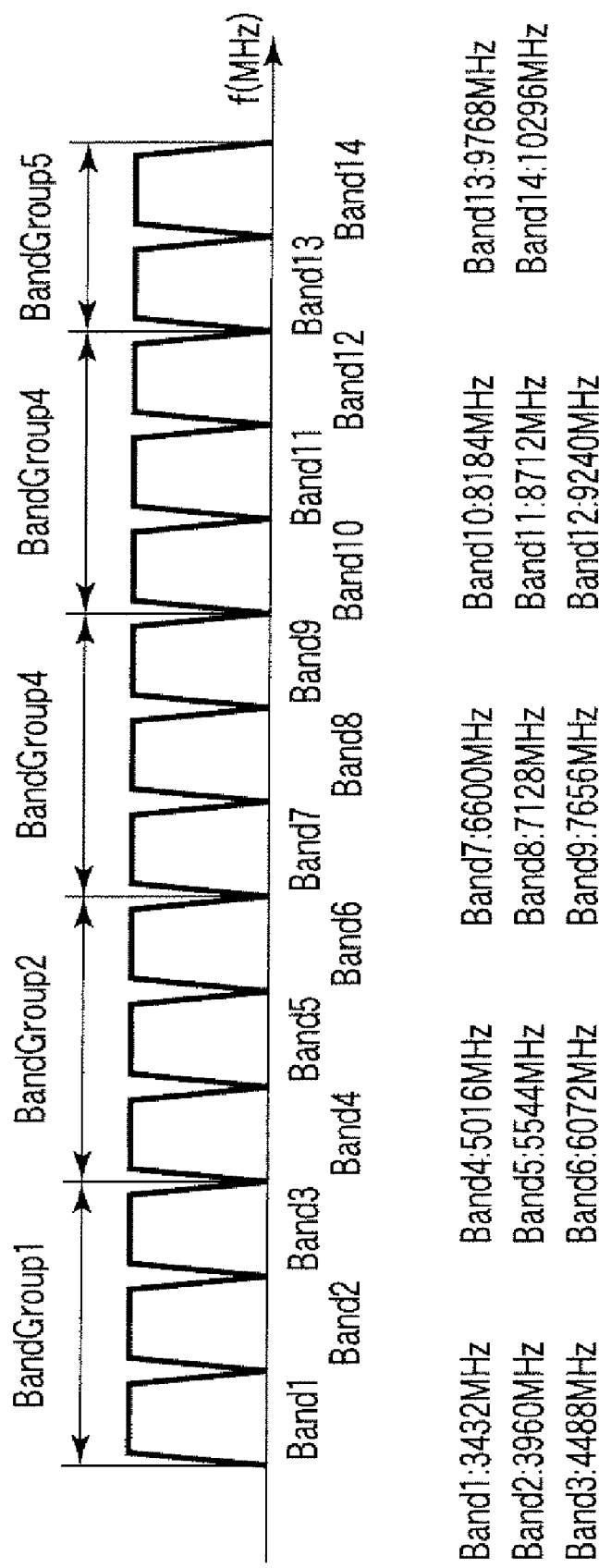
FIG. 6 is an exemplary view depicting band group allocation to be used in the UWB.

FIG. 6 shows an exemplary band group allocation to be used in the UWB. The frequency band to be used in the UWB is divided by 528 MHz per band from 3.1 to 10.6 GHz. One group (except band group 5) composed of three of these divided frequency bands is called a band group, the frequency band is used for the communication for each band group. Each group formed by a plurality of UWB devices each select one band group, and communicates by performing frequency hopping based on the TFC numbers mentioned below. Depending on this frequency hopping, the UWB devices avoid communication conflicts with other groups which have selected the identical band group.

Figures 7, 8:
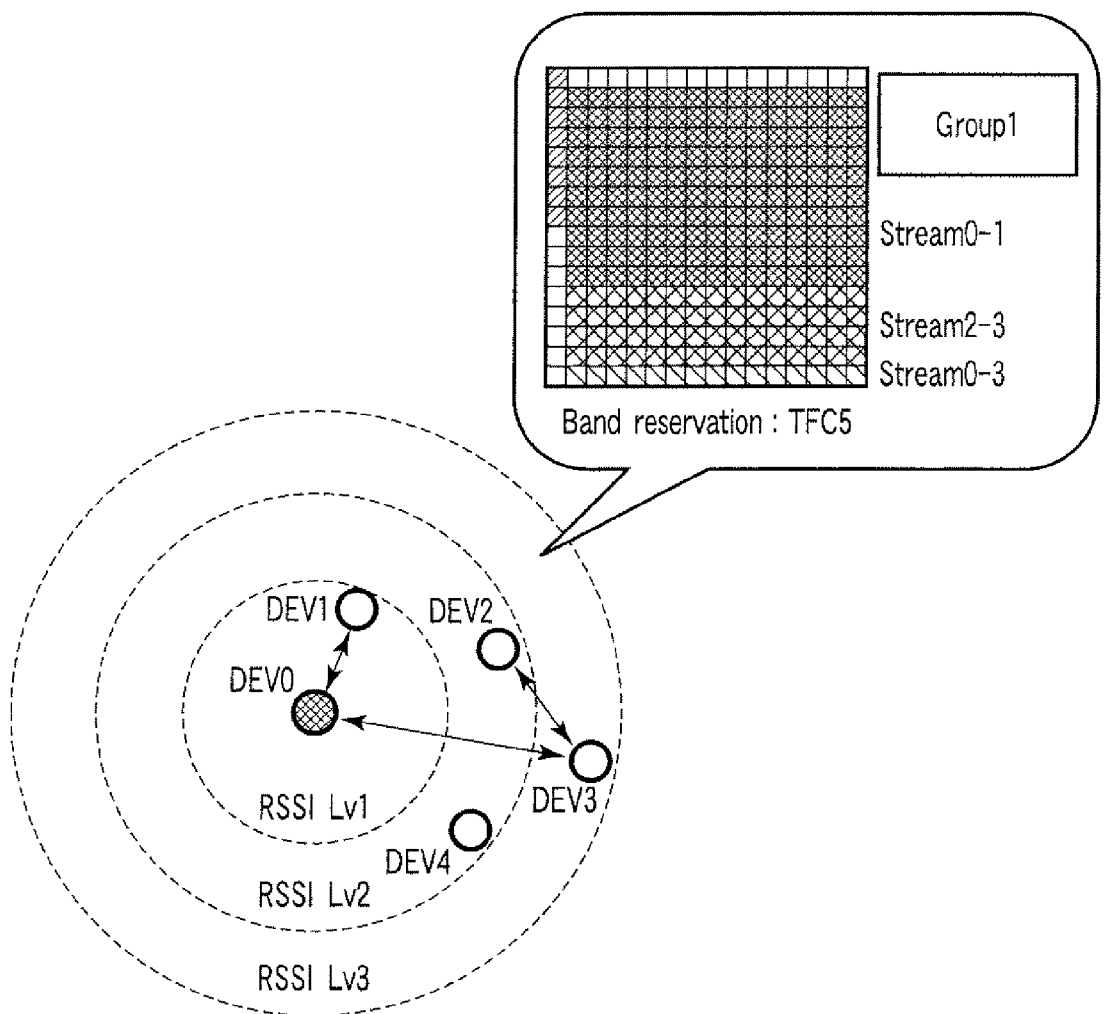
FIG. 7 is an exemplary view depicting a configuration of time-frequency code (TFC) numbers to be used in the UWB.
FIG. 8 is an exemplary view depicting a radio communication situation by a UWB device group of the embodiment at a certain time point.

FIG. 7 shows an exemplary configuration of the TFC numbers. For instance, when the group of band group X uses the TFC number 1, the UWB devices communicates by performing the frequency hopping in order of band 1, band 2, band 3, band 1, . . . . As shown in FIG. 7, since hopping patterns of the band to be used for the communication are different from one another for each TFC number, frequency influence of other groups (in the identical band group) may be avoided.

FIG. 8 shows an exemplary view illustrating the radio communication situation by the UWB device 10 group of the embodiment at a certain time point. As shown in the figure, on radio communication group (Group 1) consists of a plurality of UWB devices 10 (DEV 0-DEV 4). Each UWS device 10 utilizes a frequency band TFC 5 and makes a reservation for a necessary communication band to perform communication.

At the start of radio communication, each UWB device 10 has to recognize how the current band reservation is made. The beacon slot is used to recognize the band reservation. The UWB devices 10 mutually acquire and store the RSSI information included in the beacon to be transmitted and received during this beacon slot.

Here, as shown in FIG. 8, it is assumed that the reservation bands of the communication between DEV 0 and DEV 1 are reserved by occupying a large number of bands (stream 0-1), or that the reservation band of the communication therebetween is in a reservation situation with low priority. In such a reservation situation, if DEV 4 intends to make a new reservation for the communication with DEV 3, some or the entire reservation bands of stream 0-1 have to be released conventionally. Or, it is impossible for the start of the communication because DEV 4 has not secured the MAS successfully. Here, it is assumed that the reservation band of stream 01 is latter one with low priority.

In this case, stream 0-1 forcibly has to release the band now in reservation. In such a case, the UWB 10 group of the embodiment utilizes the RSSI information which has acquired and stored in the beacon slot, and tries to make a reservation for MAS in the method to be proposed in this invention.

Figure 9:
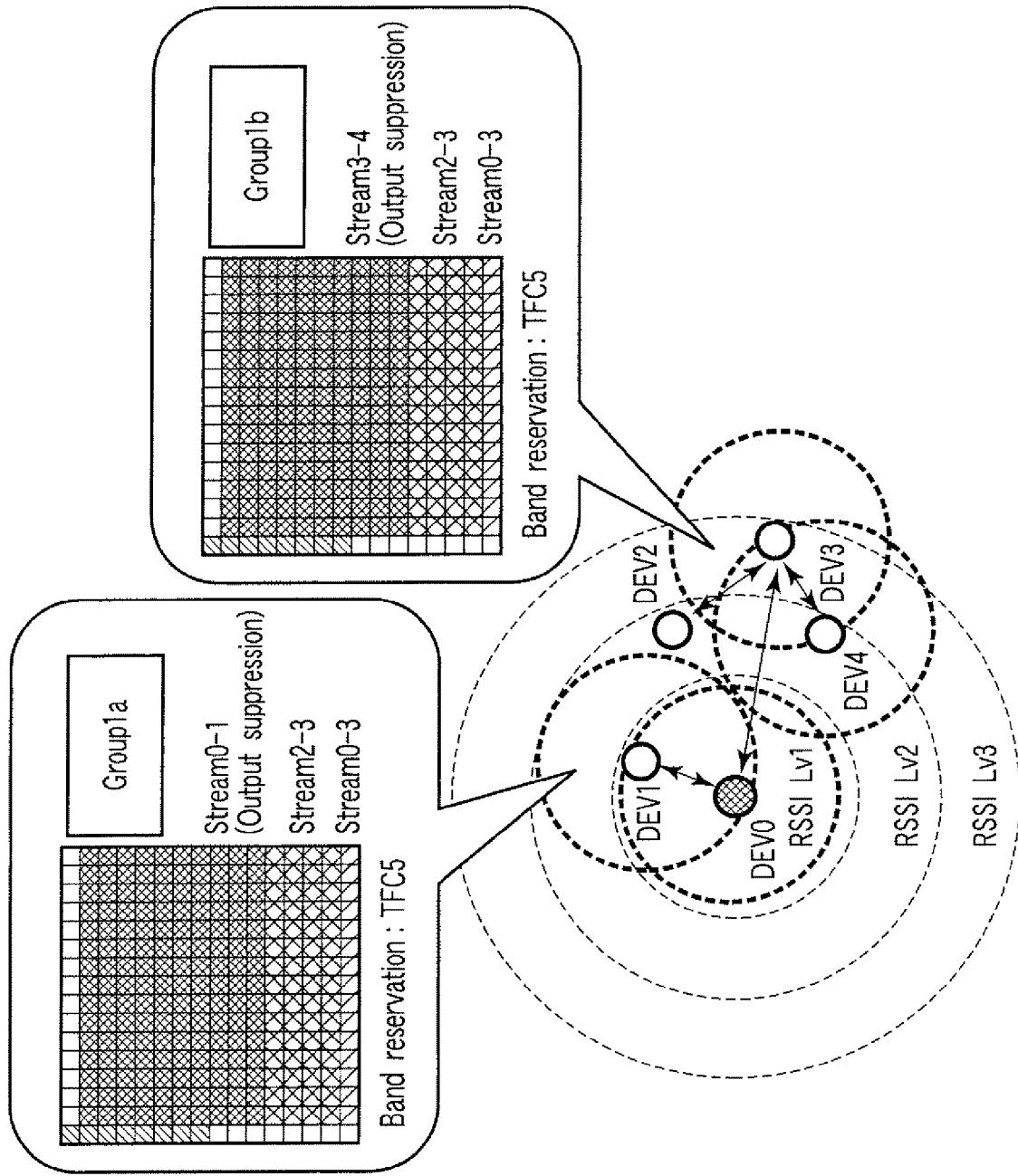
FIG. 9 is an exemplary view depicting an aspect in which the UWB device group of the embodiment has newly made a reservation from the radio communication situation depicted in FIG. 8.

FIG. 9 shows an exemplary view illustrating an aspect in which the UWB device 10 group of the embodiment makes a new reservation for the MAS from the radio communication situation shown in FIG. 8.

According to a basic principle, if a MAS which enables communication by using the same band and the same frequency is calculated by communicating while reducing transmission outputs among the UWB devices 10, the start of new communication may be established without releasing the reservation band and without making a MAS reservation by which a new group is formed by other TFC group and other band group.

FIG. 10 shows an exemplary calculation example of an inter-device signal strength variation value based on the RSSI information. Since each UWB device 10 moves its position with time elapse, it is needed to periodically update the RSSI information. It is assumed that at a certain time t, the RSSI between DEV 0 and DEV 1 is Lv1, and overlapped band reservations are made as shown in FIG. 9. However, at a time t+1, if the RSSI information has become Lv3 due to the movement of DEV 0 or DEV 1, there is some possibility that a conflict occurs in the overlapped band allocation slots. Therefore, from the history of the RSSI information, each UWB device 10 determines that the devices now in communication with each other are going away from each other (signal strength variation value: −), or getting close to each other (signal strength variation value: + or zero), and then, determines the acceptability of overlapped band allocation by output suppression.

FIG. 11 shows an exemplary flowchart illustrating the communication control procedure of the UWS device 10 of the embodiment. Here, it is assumed that new communication is started in the aforementioned group 1.

In starting the communication, the control unit 11 receives beacons in group 1 so as to recognize other participating UWB devices 10 and to secure a reserved time in which self device may make communication (Block A1). The control unit 11 makes the band allocation management unit 15 reserve a communication slot which is not overlapped with other UWB devices 10 in order to perform communication in group 1, and also at this moment, makes the RSSI management unit 14 acquire to store the RSSI information of other UWB devices 10 (Block A2).

If the band allocation management unit 15 has ensured the reservation slot successfully (YES in Block A3), the control unit 11 starts the communication in group 1 as it is (Block A4). Conversely, if the allocation management unit 15 has not ensured the reservation slot (NO in Block A3), the control unit 11 detects a period in which the communication with suppressed transmission output enables coexistence of the MASs even if the reservation bands are overlapped in accordance with the following procedures (Block A5).

In other words, based on the RSSI information which is stored currently, for example, in the case of DEV 4, the control unit II compares whether the existing communication is not influenced as compared with the RSSI information of DEV 0 and DEV 1 with the RSSI information of the self device and DEV 3. More specifically, DEV 4 transmits the beacon with the information of an RSSI level of each UWB device 10 to be reset inserted therein during a beacon slot. DEV 0, DEV 1, DEV 3 which have received this beacon perform the same comparison as mentioned above to check the influence on the existing communication. If there is no problem, DEV 0, DEV 1, DEV 3 continue to receive the beacons transmitted from DEV 4 until the communication will start. Conversely, if there is any problem, DEV 0, DEV 1, DEV 3 refuse the beacons by making the beacons collide with one another. The RSSI management unit 14 acquires and stores the RSSI information among each of the UWB devices 10 in receiving the beacons. Thereby, it is tried whether or not the communication with suppressed transmission outputs enables coexistence of the MASs even if the reservation bands are overlapped with one another.

If the coexistence is disabled (NO in Block A5), the control unit 11 postpones the communication until other UWB devices 10 release the MASs and until the required number of MASs may be secured (Block A6). Conversely, if the coexistence is enabled (YES in Block A5), the control unit 11 makes the RSSI management unit 14 calculate the signal strength variation value among UWB devices 10 from the stored RSSI information and checks the calculated value (Block A7).

If the signal strength variation value among UWB devices 10 is none or small (signal strength variation value: +or 0) (YES in Block A7), it is determined that the variation in a network state is small. Then, the control unit 11 makes the band allocation management unit 15 obtain the bands in an overlapped manner. The control unit 11 sets groups 1a and 1b using the reservation bands so as to perform communication with the suppressed communication outputs during the overlapped band-period (Block A8). Conversely, if the signal strength variation value among the UWS devices 10 is large (signal strength variation value: −) (NO in Block A7), it is determined that the variation in the network are large, and so the possibility of the conflict becomes high in the case of obtaining the bands in an overlapped manner, the control unit 11 does not obtain the bands in an overlapped manner, and postpones the communication until other UWB devices 10 release the MASs and the required number of MASs is secured (Block A6).

The control unit 11 makes the radio unit 12 perform the communication while switching the transmission outputs in set group 1a or 1b (block A9). This setting is stored until the communication terminates, after the termination of either overlapped communication, the control unit 11 recovers the outputs in the remaining reservation bands to the original transmission outputs.

As mentioned above, according to the radio communication apparatus of the embodiment, resource management, which enables to perform the radio communication efficiently even in the situation of the shortage in resource, is achieved.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A radio communication apparatus, comprising:
a first reservation slot securing unit configured to secure a first reservation slot for performing radio communication through a first transmission output in a radio communicable slot to be shared in time division in a group by adjustment in periodically formed beacon slots;
a second reservation slot securing unit configured to secure a second reservation slot for performing radio communication through a second transmission output smaller than the first transmission output in the radio-communicable period, when the first reservation slot securing unit fails in securing the first reservation slot; and
a radio communication unit configured to perform radio communication through the first transmission output or the second transmission output by using at least either the first reservation slot secured by the first reservation slot securing unit or the second reservation slot secured by the second reservation slot securing unit.

2. The radio communication apparatus according to claim 1, wherein the second reservation slot securing unit detects the second reservation slot based on received signal strength indicator (RSSI) information of each radio communication device belonging to the group which is included in beacons received in the beacon slots by the first reservation slot securing device during the beacon slots.

3. The radio communication apparatus according to claim 2, wherein the second reservation slot securing unit monitors a variation with time in the RSSI information, and determines propriety of radio communication through the second transmission output in the second reservation slot based on a situation of the variation.

4. The radio communication apparatus according to claim 2, wherein the second reservation slot securing unit determines propriety of radio communication through the second transmission output in the second reservation slot based on transmission of beacons during the beacon slots.

5. A Radio communication apparatus, comprising:
- a first reservation slot securing unit configured to secure a reservation slot for performing radio communication through a first transmission output in a radio communicable period to be shared in time division in a group by adjustment in periodically formed beacon slots;
- a second reservation slot securing unit configured to secure a second reservation slot for securing a reservation slot, in which both radio communication of self device and radio communication of other devices allowed to exist at the same timer by suppressing transmission outputs, when the first reservation slot securing unit fails in securing the first reservation slot; and
- a radio communication unit configured to perform radio communication by using the reservation slot secured by the first reservation slot securing unit or the second reservation slot securing unit while switching transmission outputs in accordance with the reservation slot secured by the first reservation slot securing unit and the reservation slot secured by the second reservation slot securing unit.

6. A radio communication control method of a radio communication system which forms a group by a plurality of radio communication apparatuses and shares radio communicable slot in time division in the group, the method comprising:
- detecting a slot in which a plurality of radio communications including new radio communication are allowed to exist at the same time by suppressing transmission outputs when it is impossible to secure a slot for the new radio communication in the radio communicable period; and
- performing the plurality of radio communications, including the new radio communication, in parallel with one another while suppressing each transmission output in the detected slot.

7. The radio communication control method of the radio communication system according to claim 6, wherein the detecting of a reservation slot in which radio communication of self device is allowed to exist with other radio communications at the same time by suppressing the transmission outputs includes performing based on the received signal strength indicator (RSSI) information of each radio communication device belonging to the group included in beacons received in the beacon slots.

8. The radio communication control method of the radio communication system according to claim 7, wherein the detecting of a reservation slot in which radio communication of self device is allowed to exist with other radio communications at the same time by suppressing the transmission outputs includes:
- monitoring a variation with time of the received signal strength indicator information; and
- determining whether or not the radio communication of the self device is allowed to exist with other radio communication at the same time based on a situation of the variation.

9. The radio communication control method of the radio communication system according to claim 7, wherein the detecting of a reservation slot in which radio communication of self device is allowed to exist with other radio communications at the same time by suppressing the transmission outputs includes determining propriety of coexistence between the radio communication of the self device and other radio communication in accordance with transmissions of beacons in the beacon slots.

* * * * *